May 28, 1940.  S. W. E. ANDERSSON  2,201,974
FLOAT VALVE
Filed June 22, 1937
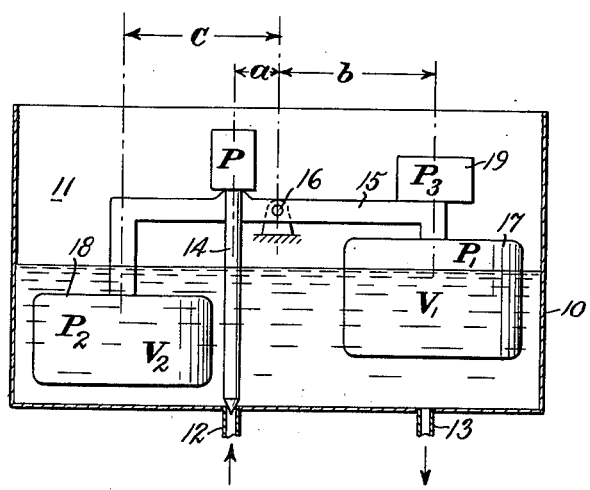
INVENTOR.
Sven W. E. Andersson
BY
E A Fenander his ATTORNEY.

Patented May 28, 1940

2,201,974

UNITED STATES PATENT OFFICE 2,201,974

FLOAT VALVE

Sven W. E. Andersson, Evansville, Ind., assignor to Servel, Inc., New York, N. Y., a corporation of Delaware Application June 22, 1937, Serial No. 149,591

5 Claims. (Cl. 137—104)

My invention relates to float operated devices, and it is an object of the invention to provide such a device having automatic compensation for liquids of different specific gravities.

The above and other objects and advantages of my invention will be better understood from the following description and accompanying drawing forming a part of this specification, and of which the single figure diagrammatically illustrates a float valve embodying the invention.

In many liquid supply systems a float valve is employed to control the flow of liquid and maintain a constant liquid level in the system. An example of such a system is that of a liquid fuel burner in which a float valve is interposed between the source of supply of liquid fuel and the burner. Where accurate control of liquid flow is desired, it is imperative to maintain a constant liquid level in a float chamber irrespective of any changes or variations in the specific gravity of the liquid. This is particularly true in liquid fuel burners where accurate control of the burner flame is necessary to effect the desired amount of heating.

In float valves of the conventional type, the liquid level in a float chamber varies considerably with changes in the specific gravity of the liquid. When the specific gravity of liquid decreases, for example, the liquid level in a float chamber becomes higher; and, conversely, when the specific gravity of the liquid increases, the liquid level in the chamber becomes lower. Where accurate control of liquid flow is of primary importance, any variations in the constant liquid level in a float chamber is objectionable.

In accordance with my invention, in order to compensate for variations in specific gravity of liquid, I provide a float valve of the character diagrammatically illustrated in the drawing. The float valve shown includes a casing 10 providing a chamber 11 having inlet and outlet openings 12 and 13. The inlet opening 12 may be connected to a delivery conduit of a liquid supply system, and the outlet 13 may be connected to a conduit for conducting the liquid to a place of use.

Within chamber 11 is disposed a needle valve 14 which cooperates with the inlet opening 12 to control the flow of liquid into the chamber. The upper end of valve 14 is fixed to a lever 15 which is pivoted within the casing 10 at 16 in any suitable manner. To one end of lever 15 is connected a float 17 and to the opposite end of the lever, at the same side of pivot 16 as the needle valve 14, is connected a body 18 which is submerged in the liquid. A balancing weight 19 is provided on lever 15 above the float 17.

In the drawing the weight of float 17 is indicated as $P_1$ and the volume of liquid displaced by the float is indicated as $V_1$. Similarly, the weight of the submerged body 18 is indicated as $P_2$, and the volume of liquid displaced by the body is indicated as $V_2$. The weight on the lever 15 at the point the needle valve 14 is connected thereto is diagrammatically indicated by a weight P, and the weight of balancing weight 19 is indicated as $P_3$. The distances of the different parts of the system from the pivot 16 are indicated as $a$, $b$, and $c$.

In the device shown the needle valve 14, lever 15, and float 17 diagrammatically represent the elements of a float valve of the conventional type. Assuming for the moment that the submerged body 18 and balancing weight 19 are not connected in the system, and disregarding the weight of lever 15, the relatively small volume of liquid displaced by needle valve 14, and the small upward force of liquid on the small valve area, the equation for equilibrium is $$Pa = P_1 b - V_1 bS$$

where $S$ = specific gravity of the liquid

From the above equilibrium equation, that is, when the needle valve 14 is closed, it will be seen that any change in the specific gravity of the liquid will vary the liquid level in chamber 11. When the specific gravity of the liquid decreases from a predetermined value, for example, a greater amount of liquid must be displaced by the float 17 to establish equilibrium, and hence the liquid level will rise to a higher level before the valve 14 is closed. On the other hand, when the specific gravity of the liquid decreases from the predetermined value, less liquid need be displaced by the float 17 to establish equilibrium, and hence the liquid level will be lower when the valve is closed.

In the float valve embodying my improvement and including the submerged body 18 and balancing weight 19, the equation for equilibrium is:

$$Pa + P_2 c - V_2 cS = (P_1 + P_3) b - V_1 Sb$$

and $$Pa - (P_1 + P_3) b + P_2 c = (V_2 c - V_1 b) S$$

From the above equilibrium equation it will be seen that the float valve provided may be made independent of the specific gravity of the liquid by making $V_2 c = V_1 b$. With a device of this character, therefore, a substantially constant liquid level may be maintained in chamber 11 irrespective of any variations or changes in specific gravity of the liquid therein.

It will also be noted that the compensated float system provided will balance even when there is no liquid in chamber 11. Under these conditions the last equation may be written as follows:

$$Pa + P_2c = (P_1 + P_3)b$$

Instead of making $V_2c = V_1b$ in the equation for the compensated system, so that a substantially constant liquid level is maintained in chamber 11, it may be possible to effect over-compensation by making $V_2c$ greater than $V_1b$. With such over-compensation, the liquid level in chamber 11 becomes higher when the specific gravity of liquid increases; and the liquid level in the chamber 11 becomes lower when the specific gravity of the liquid decreases. This is exactly the opposite of what takes place in a float valve of the conventional type in which no compensation is made for variations in specific gravity of the liquid. When over-compensation is provided by making $V_2c$ greater than $V_1b$, the equation for the compensated system with no liquid in chamber 11 is:

$$Pa + P_2c > (P_1 + P_3)b$$

From this equation it will be apparent that with overcompensation, the valve 14 is in its closed position when there is no liquid in chamber 11, thereby making it necessary to open valve 14 manually or to provide other suitable means to open the valve when operation of the float valve is started.

In order to simplify the equilibrium equations for the conventional float valve and float valve embodying my improvement, the relatively small amount of liquid displaced by needle valve 14 has been disregarded. In employing my invention in any float valve, the volume of liquid displaced by the needle valve can readily be taken into consideration to obtain the desired compensation and maintain a predetermined liquid level irrespective of changes in specific gravity of the liquid.

Although I have more or less diagrammatically shown an embodiment of my invention, it will be obvious to those skilled in the art that the invention may be used in many different ways without departing from the basic principles described. I therefore aim in the following claims to cover all such modifications and changes which come within the true spirit and scope of the invention.

What is claimed is:

1. In a liquid level sensing device, a lever, a float connected to operate said lever and having a desired submersion volume V', and a member connected to said lever to oppose said float and having a submersion volume $V^2$, where $V^2$ is equal to V' multiplied by the mechanical advantage relative to said float.

2. In a liquid level sensing device, a lever, a float connected to operate said lever and having a desired submersion volume V', and a member connected to said lever to oppose said float and having a submersion volume $V^2$, where the product of $V^2$ and the mechanical advantage of said member is equal to or greater than the product of V' and the mechanical advantage relative to said float.

3. For use in a liquid supply system, a device providing a chamber to hold liquid in the system, said chamber having an inlet and an outlet for the liquid, mechanism to maintain a predetermined liquid level in said chamber, a float connected to operate said mechanism, and a member submerged in said liquid and operatively connected to said mechanism, the weights and submersion volumes of said float and said member having a fixed relationship such that operation of said mechanism is the same irrespective of specific gravity of the liquid.

4. For use in a liquid supply system, a device providing a chamber to hold liquid in the system, said chamber having an inlet and outlet for the liquid, mechanism to maintain a desired liquid level in said chamber irrespective of changes in specific gravity of the liquid in the system, said mechanism including a float and a member adapted to be at least partly submerged in the liquid, said float and said member being so constructed and arranged that a force due to buoyancy exerted by said float at a certain depth of submersion is substantially equal to or less than a force due to buoyancy exerted by said member.

5. In a liquid level sensing device, a lever, a float connected to operate said lever and having a desired submersion volume V' less than the total volume of the float, and a member connected to said lever to oppose said float and having a submersion volume $V^2$, where $V^2$ is equal to V' multiplied by the mechanical advantage relative to said float.

SVEN W. E. ANDERSSON.